(12) United States Patent
Ooitsu et al.

(10) Patent No.: US 6,682,224 B2
(45) Date of Patent: Jan. 27, 2004

(54) BEARING CAGE AND ROLLING BEARING HAVING THE SAME

(75) Inventors: Junya Ooitsu, Kashiwara (JP); Hiroshi Toyota, Tondabayashi (JP)

(73) Assignee: Koyo Seiko Co., Ltd., Osaka (JP)

( * ) Notice: Subject to any disclaimer, the term of this patent is extended or adjusted under 35 U.S.C. 154(b) by 20 days.

(21) Appl. No.: 10/105,465

(22) Filed: Mar. 25, 2002

(65) Prior Publication Data

US 2002/0141674 A1 Oct. 3, 2002

(30) Foreign Application Priority Data

Mar. 29, 2001 (JP) .................................... P2001-096976

(51) Int. Cl.[7] ................................................ F16C 33/56
(52) U.S. Cl. ........................................ 384/527; 384/908
(58) Field of Search ................................ 384/523, 527, 384/531, 572, 576, 907, 911, 908, 909

(56) References Cited

U.S. PATENT DOCUMENTS 5,988,891 A * 11/1999 Yamamoto et al. ......... 384/527
6,203,207 B1 * 3/2001 Yamamoto et al. ......... 384/909
6,332,717 B1 * 12/2001 Oohira et al. .............. 384/527
6,367,981 B1 * 4/2002 Yamamoto et al. ......... 384/527

FOREIGN PATENT DOCUMENTS

| JP | 05032989 A | 2/1993 |
| JP | 11125257 A | 5/1999 |

\* cited by examiner

*Primary Examiner*—Thomas R. Hannon
(74) *Attorney, Agent, or Firm*—Jordan and Hamburg LLP

(57) ABSTRACT

A rolling bearing comprises an inner ring, an outer ring concentric with the inner ring, a plurality of rolling elements interposed between the inner ring and the outer ring, and a cage having pockets each accommodating the rolling elements one each. The cage comprises base material made of thermoplastic resin. Reinforced fiber and solid lubricant are mixed into the base material. The solid lubricant includes three materials, i.e., polytetrafluoroethylene, molybdenum disulfide and graphite.

20 Claims, 3 Drawing Sheets

F I G. 1
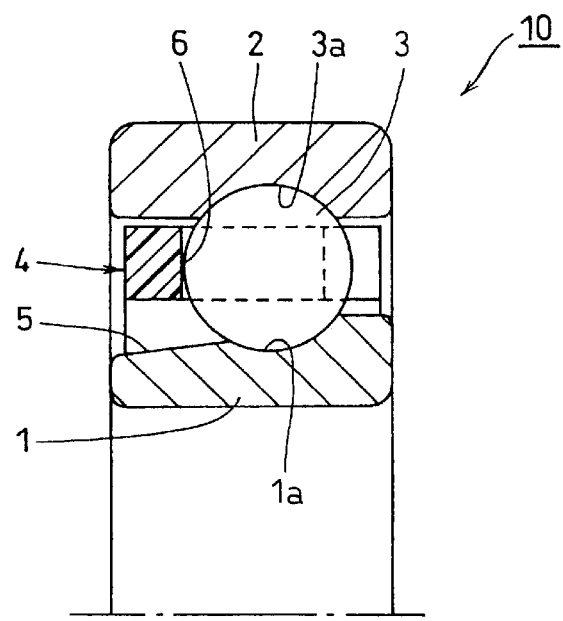
F I G. 2
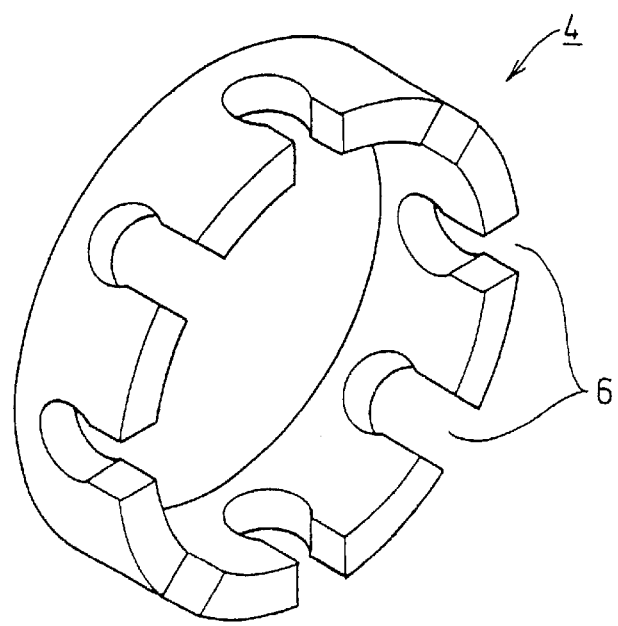

F I G. 3
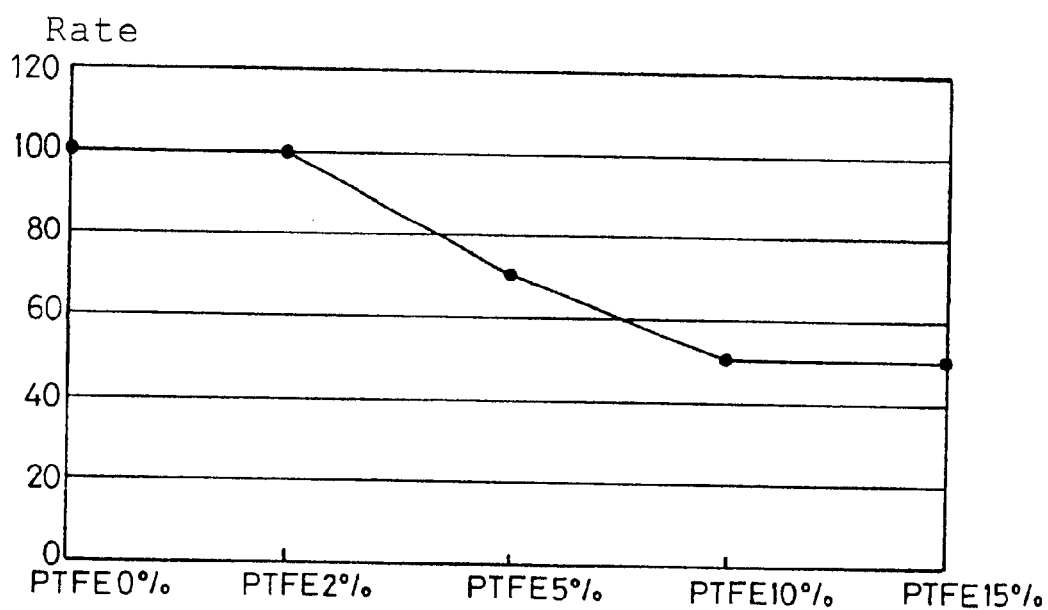

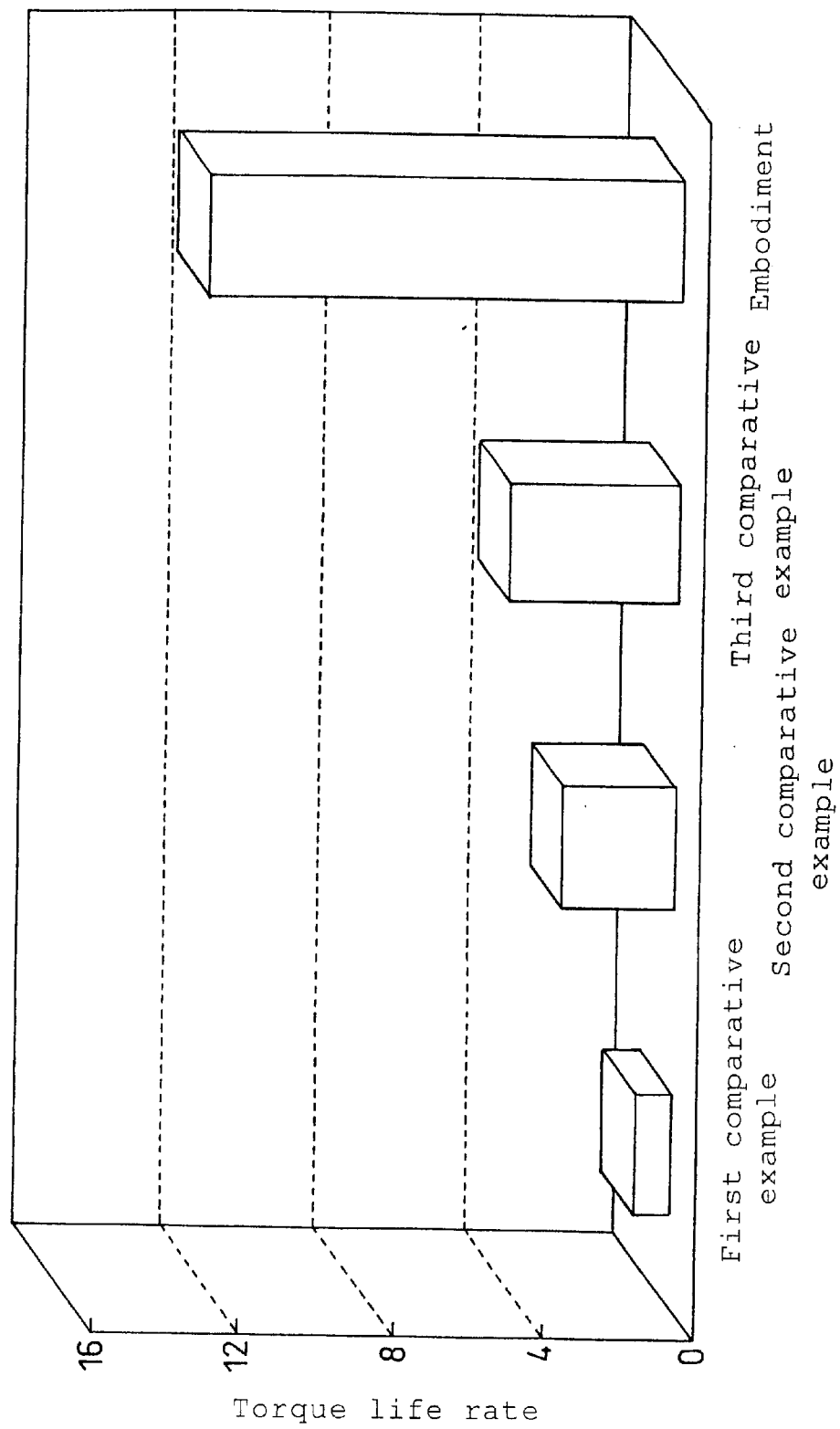

BEARING CAGE AND ROLLING BEARING HAVING THE SAME

BACKGROUND OF THE INVENTION

1. Field of the invention

The present invention relates to a bearing cage comprising thermoplastic resin as base material, and to a rolling bearing having the bearing cage.

2. Description of the Related Art

The rolling bearing has a cage interposed between an inner ring and an outer ring. The cage holds a plurality of rolling elements. In such a rolling bearing, generally, lubricant is not used under environment of severe lubricating condition such as high temperature and high pressure. Instead the cage itself has lubricating ability. As one of techniques for providing the cage itself with lubricating ability, it is proposed that the cage is made of resin.

The present inventors have selected and used polytetrafluoroethylene (PTFE) as base material of the cage. Polytetrafluoroethylene has excellent lubricating performance and excellent out gas ability.

However the cage using polytetrafluoroethylene as the base material can not be formed by injection molding and is required to be formed by shaving. As a result, it takes a long time to manufacture the cage, which increases the manufacturing cost of the whole rolling bearing.

There are various kinds of thermoplastic resins as resins which can be injection molded. The thermoplastic resins may be used as the base material of the cage. The cage is, however, brought into contact with the rolling elements or the like. Therefore the thermoplastic resins, when used as the base material of the cage, causes wearing amount or torque of the cage to increase at early stage of use of the rolling. Thus, the performance of the cage is deteriorated at the early stage, and life of the rolling bearing having the cage is affected.

SUMMARY OF THE INVENTION

Therefore, it is an object of the present invention to make it possible to easily manufacture a cage using thermoplastic resin as its base material and to make it possible to prevent the wearing amount or torque of the cage from increasing at early stage of use of the rolling bearing having the cage.

To achieve the above object, a rolling bearing of the present invention comprises an inner ring, an outer ring concentric with the inner ring, a cage interposed between the inner ring and the outer ring and a plurality of rolling elements held by the cage. The cage comprises base material, reinforced fiber and solid lubricant. The base material is thermoplastic resin. The reinforced fiber and solid lubricant are mixed into the base material. The reinforced fiber of 5 to 30 wt % is mixed with the base material. As the solid lubricant three kinds of materials, i.e., polytetrafluoroethylene of 5 to 30 wt %, molybdenum disulfide ($MoS_2$) of 3 to 15 wt % and graphite (C) of 3 to 15 wt % are mixed with the base material.

In the case of the rolling bearing of the present invention, since thermoplastic resin is used as the base material of the cage, the cage can be formed by injection molding. Thus, manufacturing time of the cage can be shortened, and the manufacturing cost of the rolling bearing having the cage can be reduced. In this cage, the reinforced fiber and solid lubricant are mixed into the thermoplastic resin.

With the above wt % polytetrafluoroethylene, molybdenum disulfide and graphite are included in the solid lubricant. Nevertheless the thermoplastic resin is, therefore, used as the base material of the cage, wear resistance is enhanced, the dust-generating properties are reduced and life of the cage is elongated.

Being configured by the base material using thermoplastic resin, the cage of the present invention can be easily manufactured by working easiness which is a feature of thermoplastic resin. Since the cage of the present invention includes the reinforced fiber and solid lubricant in the base material, a defect of the cage using thermoplastic resin as the base material, such as wear resistance, can be overcome. Thereby the life of the rolling bearing using the cage can be elongated.

In the rolling bearing of the present invention, it is preferable that the thermoplastic resin is selected from either one of ethylene tetrafluoroethylene (ETFE), polyether ether ketone (PEEK), polyamidimide (PAI) alloy and thermoplastic polyimide (TPI). Such thermoplastic resin is excellent in out gas characteristics. Mixed amounts of the reinforced fiber and solid lubricant are specified with respect to the thermoplastic resin. Thereby the environment contamination caused by the out gas can be suppressed and excellent lubricating ability can be exhibited for a long term.

Preferably, in the rolling bearing of the present invention, potassium titanate whisker is selected as the reinforced fiber. If the potassium titanate whisker is used as the reinforced fiber, strength of the cage is enhanced, a mating member which is brought into contact with the cage is less prone to be damaged, and dust-generating suppressing effect is especially enhanced.

BRIEF DESCRIPTION OF THE DRAWINGS

These and other objects as well as advantages of the invention will become clear by the following description of preferred embodiments of the invention with reference to the accompanying drawings, wherein:

FIG. 1 is a vertical sectional view of an upper half of a rolling bearing having a cage according to a preferred embodiment of the present invention;

FIG. 2 is a perspective view of the cage in the rolling bearing shown in FIG. 1;

FIG. 3 is a graph showing a result of dust-generating test of the rolling bearing, and the test was carried out while changing a mixed amount of polytetrafluoroethylene which is solid lubricant with respect to thermoplastic resin which is a base material of the cage; and FIG. 4 is a graph showing a result of a torque life test with respect to the rolling bearing shown in FIG. 1.

DETAILED DESCRIPTION OF PREFERRED EMBODIMENTS

Referring now to FIG. 1, an angular contact ball bearing 10 will be explained. The bearing 10 is one example of a rolling bearing of a preferred embodiment of the present invention. This bearing 10 includes an inner ring 1, an outer ring 2, a plurality of balls 3 as rolling elements, and a cage 4. The cage 4 is of outer ring-guiding type guided by an inner peripheral surface of the outer ring 2. In this case, the cage 4 can likewise be applied to inner ring-guiding type guided by an outer peripheral surface of the inner ring 1.

The inner ring 1 is provided at its axially central portion of its outer peripheral surface with a raceway groove 1a having arc cross section. The inner ring 1 is also provided at a shoulder portion of one side of the outer peripheral surface with a counterbore 5. The counterbore 5 is formed by chamfering the counterbore 5 in a form of tapered shape such that hooking margins are left in the raceway groove 1a of the inner ring 1 for the balls 3. The outer ring 2 is provided at its axially central portion of its inner peripheral surface with a raceway groove 2a having arc cross section.

The cage 4 is so-called snap cage. The cage 4 includes a plurality of pockets 6. These pockets 6 are formed such that the pockets 6 pass through the cage 4 in its diametric direction at several positions at equal distances from one another, and are opened in axially one direction.

In the cage 4, thermoplastic resin is used as base material, so that the cage 4 can be formed by injection molding. The cage 4 comprises reinforced fiber and solid lubricant in addition to the base material. The reinforced fiber and the solid lubricant are mixed with the base material at their respective predetermined rates (wt %). Here wt % means percentage by weight. A total wt % of the base material, reinforced fiber and solid lubricant is 100 wt %.

The thermoplastic resin used as the base material of the cage 4 is resin which softens or melts by being heated, and solidifies either by cooling or by being cooled. Any thermoplastic resin can be used as the base material of the cage 4. Examples of preferable thermoplastic resin as the base material are ethylene tetrafluoroethylene (ETFE), polyether ether ketone (PEEK), polyamidimide (PAI) alloy, thermoplastic polyimide (TPI).

An example of the polyamidimide alloy is AI polymer (tradename) produced by Mitsubishi Gas Chemical Company, Inc. of Japan. An example of the thermoplastic polyimide is Aurum (tradename) produced by Mitsui Chemicals, Inc. of Japan.

The reinforced fiber is mixed with the base material with a view to reinforcing the base material. Preferably, short fiber whose fiber length is short is selected as the reinforced fiber. Preferably, the short fiber has a diameter of 2 μm or less.

Preferably, the reinforced fiber has average fiber diameter of 0.3 to 0.6 μm. Here the average fiber diameter means average diameter of a plurality of fibers. Preferably, the reinforced fiber has average fiber length of 10 to 20 μm. Here the average fiber length means average length of a plurality of fibers. Preferably, the mixed amount of the reinforced fiber is 5 to 30 wt %.

The solid lubricant is mixed with the base material for the purpose of providing the bearing 10 with lubricating ability. Preferably, as the solid lubricant, the following three kinds of materials are selected. That is, these materials are polytetrafluoroethylene (PTFE), molybdenum disulfide and graphite. As the mixed amount of the solid lubricant, preferably, polytetrafluoroethylene is 5 to 30 wt %, molybdenum disulfide is 3 to 15 wt %, and graphite is 3 to 15 wt %.

From the above facts, the cage 4 comprises the thermoplastic resin, the reinforced fiber and the solid lubricant. The mixed amount of the reinforced fiber is 5 to 30 wt %. The solid lubricant includes three kinds of materials: polytetrafluoroethylene, molybdenum disulfide and graphite. The mixed amounts of each of polytetrafluoroethylene, molybdenum disulfide and graphite are 5 to 30 wt %, 3 to 15 wt %, and 3 to 15 wt %, respectively. Thus the cage 4 can be formed by the injection molding.

In this case, potassium titanate whisker may be selected as the reinforced fiber. The potassium titanate whisker has properties capable of enhancing the entire strength of the thermoplastic resin which is the base material, while the fiber hardness of the potassium titanate whisker is lower than other general reinforced fiber such as glass fiber and carbon fiber. Therefore the potassium titanate whisker does not damage a mating member such as the balls 3, the inner ring 1 and outer ring 2 of the bearing and thus can contribute to prevent dust from being generated from the mating member.

A reason why the mixed amount of the reinforced fiber is set to 5 to 30 wt % is as follows. As the mixed amount of reinforced fiber is increased, the reinforced fiber can reinforce the base material more strongly, while offensive nature of the reinforced fiber against the mating member appears more strongly. In consideration of such mutually contradicting nature of the reinforced fiber, a lower limit of the mixed amount of the reinforced fiber is set to 5 wt %, while an upper limit is set to 30 wt %. More preferably, the mixed amount of the reinforced fiber is set to 10 to 20 wt %, most preferably, 10 wt %.

As above, polytetrafluoroethylene is selected as one material of the solid lubricant. This is because polytetrafluoroethylene is excellent in lubricating action by transfer of wear powder thereof.

The mixed amount of the polytetrafluoroethylene is set to 5 to 30 wt % on the basis of following reasons. The upper limit of the mixed amount of the polytetrafluoroethylene is determined in consideration of the mixed easiness with respect to the thermoplastic resin, in other words, molding easiness of injection molding. As a result the upper limit is 30 wt %. The lower limit of the mixed amount of the polytetrafluoroethylene is determined based on a dust-generating amount in actual working test under the condition that the cage 4 is incorporated in the rolling bearing. As a result the lower limit is 5 wt %.

The rolling bearing used in the actual working test has JIS (Japanese Industrial Standards) bearing designation 608. A laser light-scattering type particle counter is used as a dust-generation measuring apparatus. The test environment is $10^{-5}$ Pa and 200° C., and axial load of 100 N is applied to the rolling bearing.

As the cage 4, polyether ether ketone is used as the base material. Potassium titanate whisker of 10 wt % as the reinforced fiber and polytetrafluoroethylene of 20 wt % as the solid lubricant are mixed and mulled and melted, respectively.

The cage 4 is formed by charging these materials into a predetermined shaping dies. The actual working test is carried out while variously changing only the mixed amount of the polytetrafluoroethylene.

Results are shown in a graph of FIG. 3. If the mixed amount of polytetrafluoroethylene becomes 2 wt % or less, the dust-generation amount is remarkably increased. If the mixed amount of polytetrafluoroethylene exceeds 2 wt %, the dust-generation amount is gradually reduced. If the mixed amount of polytetrafluoroethylene becomes 10 wt % or more, the dust-generation amount is reduced in half as compared with the case of 2 wt % or less. If the mixed amount of polytetrafluoroethylene becomes 5 wt %, the dust-generation amount assumes a value between a case of 10 wt % or more and a case of 2 wt % or less.

In FIG. 3, a vertical axis represents a rate, and a horizontal axis represents the mixed amount (wt %) of polytetrafluoroethylene. Here the rate is a coefficient of friction. The rate "100" shown in FIG. 3 means a coefficient of friction when the mixed amount of polytetrafluoroethylene is 0 wt %. Therefore when the mixed amount of polytetrafluoroethylene is added starting from 0 wt %, the rate is lowered starting from a value of 100 accordingly.

From the above reasons, most preferably, the lower limit of the polytetrafluoroethylene is set to 10 wt % or more. However, depending upon conditions of using environment, the polytetrafluoroethylene of 5 wt % can sufficiently show the lubricating performance. Therefore the lower limit of the polytetrafluoroethylene is set to 5 wt % with sufficient lead.

A reason why the mixed amounts of the molybdenum disulfide and graphite are set to 3 to 15 wt % is as follows. That is, if their mixed amounts are set to less than 3 wt %, their lubricating ability becomes poor. If their mixed amounts exceed 15 wt %, their mechanical strength is poor. Furthermore it is more preferable that their mixed amounts of the molybdenum disulfide and graphite are 6 to 15 wt %.

Next, a torque life test of the rolling bearing was conducted. The conditions of the test are as follows. The cage 4 is incorporated in the rolling bearing whose JIS bearing designation is 608. A torque test apparatus is a vacuum high temperature torque test apparatus. The test environment is $10^{-5}$ Pa and 200° C., and axial load of 100 N applied to the rolling bearing. The torque life means driving time spent until measured torque reaches three times or more of initial torque.

Torque life test was performed for a total of four cases, i.e., first to third comparative examples and the embodiment.

A cage of the first comparative example uses polyether ether ketone as base material. Only potassium titanate whisker of 30 wt % as the reinforced fiber was mixed with the base material, and the solid lubricant was not mixed. The cage of the first comparative example was produced by charging the material into a predetermined shaping dies.

A cage of the second comparative example uses polyether ether ketone as base material. Potassium titanate whisker of 10 wt % having a diameter of 2 μm or less as the reinforced fiber and polytetrafluoroethylene of 20 wt % as the solid lubricant are mixed with the base material. After these base material, the reinforced fiber and the solid lubricant are mulled and melted, they are charged into the shaping dies. Thus the cage of the first comparative example 1 is produced.

A cage 4 of the third comparative example uses polyether ether ketone as base material. Potassium titanate whisker of 10 wt % having a diameter of 2 μm or less as the reinforced fiber, and two materials, i.e., polytetrafluoroethylene of 20 wt % and molybdenum disulfide of 3 wt % as the solid lubricant are mixed with the base material.

A cage 4 of the embodiment uses polyether ether ketone as the base material. Potassium titanate whisker of 10 wt % having a diameter of 2 μm or less as the reinforced fiber, and three materials, i.e., polytetrafluoroethylene of 15 wt % and molybdenum disulfide of 3 wt % and graphite of 5 wt % as the solid lubricant are mixed with the base material.

As a result, as shown in FIG. 4, cage life of the first comparative example is defined as "1". According to the definition of life of the cage, cage life of the second comparative example is about three times longer, cage life of the third comparative example is about four times longer, and cage life of the embodiment does not end even after 12 times or longer time has passed.

The above tests show that the cage life is considerably elongated even when only two materials (polytetrafluoroethylene and molybdenum disulfide) in the third comparative example are mixed as the solid lubricant.

The test of the embodiment shows that if the three kinds of materials (polytetrafluoroethylene, molybdenum disulfide and graphite) are mixed as the solid lubricant, the cage life is further elongated.

As explained above, if the cage 4 of the embodiment is used, the cages can be mass-produced by injection molding, the dust-generating properties can be suppressed, the torque life is remarkably elongated and thus, the cage is effective for use in a field where both low dust-generating properties and long life of the bearing are required.

The rolling bearing of the present invention is not limited to the angular contact ball bearing.

The rolling bearing of the present invention may be a ball bearing such as deep groove ball bearing, a cylindrical roller bearing, a needle roller bearing, a tapered roller bearing, a spherical roller bearing or the like.

In accordance with the types of the bearing, various types of cage 4 such as snap cage or machined cage are used. The present invention can be applied to any of types. The cage 4 is interposed between the inner ring 1 and the outer ring 2 for holding the plurality of rolling elements. The inner ring 1 and outer ring 2, which have each circular outer peripheral surface and circular inner peripheral surface, may be configured by a member having circular raceway surface.

The rolling bearing of the present invention can be used for a semiconductor manufacturing apparatus, supercharger of automobile engine, gas turbine, machine tool and the like.

Especially when the rolling bearing of the present invention is used at high temperature and high rotation speed, it is preferable that the inner and outer rings 1, 2 and the balls 3 are made of high-carbon chromium bearing steel (JIS specification SUJ2), heat-proof material or ceramics. Examples of the heat-proof material are metals such as martensitic stainless steel (JIS SUS440C, SUS420C or the like), heat-proof, corrosion-proof alloy (AISI specification M-50, JIS high speed tool steels SKH4 or the like), heat-proof bearing steel and the like. The material of the rolling bearing may appropriately be subjected to hardening process such as quenching, tempering or the like.

The heat-proof bearing steel includes carbon (0.8 wt % or more, 1.5 wt % or less), silicon (0.5 wt % or more, 2.0 wt % or less), manganese (0.3 wt % or more, 2.0 wt % or less), chromium (1.3 wt % or more, 2.1 wt % or less), and molybdenum (0.3 wt % or more, 1.0 wt % or less), and includes silicon and molybdenum in a range of 1.0 wt % or more in total, and balance comprises iron and unavoidable impurities.

Main material of the ceramics is silicon nitride ($Si_3N_4$), and as sintering aids, yttria ($Y_2O_3$), alumina ($Al_2O_3$), aluminum nitride (AlN), titanium oxide ($TiO_2$) are added to the silicon nitride, or alumina ($Al_2O_3$), silicon carbide (Sic), zirconia ($ZrO_2$), or aluminum nitride (AlN) is used.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A rolling bearing comprising:

an inner ring;

an outer ring concentric with said inner ring;

a cage interposed between said inner ring and said outer ring; and a plurality of rolling elements held by said cage;

wherein said cage comprises base material, reinforced fiber and solid lubricant;

said base material is thermoplastic resin;

said reinforced fiber of 5 to 30 wt % is mixed with said base material;

said solid lubricant comprises polytetrafluoroethylene of 5 to 30 wt %, molybdenum disulfide of 3 to 15 wt % and graphite of 3 to 15 wt % and is mixed with said base material.

2. The rolling bearing according to claim 1, wherein said base material is selected from either one of ethylene tetrafluoroethylene, polyether ether ketone, polyamidimide alloy and thermoplastic polyimide.

3. The rolling bearing according to claim 1, wherein said reinforced fiber is potassium titanate whisker.

4. The rolling bearing according to claim 1, wherein said reinforced fiber is short fiber having a diameter of 2 μm or less.

5. The rolling bearing according to claim 1, wherein said reinforced fiber is fiber having average fiber diameter of 0.3 to 0.6 μm.

6. The rolling bearing according to claim 1, wherein said reinforced fiber is fiber having average fiber length of 10 to 20 μm.

7. A rolling bearing comprising:
an inner ring;
an outer ring concentric with said inner ring;
a cage interposed between said inner ring and said outer ring; and
a plurality of rolling elements held by said cage; wherein
said cage comprises base material, reinforced fiber and solid lubricant;
said base material is thermoplastic resin selected from either one of ethylene tetrafluoroethylene, polyether ether ketone, polyamidimide alloy and thermoplastic polyimide;
said reinforced fiber of 5 to 20 wt % is mixed with said base material;
said solid lubricant comprises polytetrafluoroethylene of 5 to 30 wt %, molybdenum disulfide of 3 to 15 wt % and graphite of 3 to 15 wt % and is mixed into said base material.

8. A rolling bearing comprising:
an inner ring;
an outer ring concentric with said inner ring;
a cage interposed between said inner ring and said outer ring; and
a plurality of rolling elements held by said cage; wherein
said cage comprises base material, reinforced fiber and solid lubricant;
said base material is thermoplastic resin selected from either one of ethylene tetrafluoroethylene, polyether ether ketone, polyamidimide alloy and thermoplastic polyimide;
said reinforced fiber is potassium titanate whisker, said reinforced fiber of 5 to 30 wt % being mixed with said base material;
said solid lubricant comprises polytetrafluoroethylene of 5 to 30 wt %, molybdenum disulfide of 3 to 15 wt % and graphite of 3 to 15 wt % and is mixed with said base material.

9. A bearing cage interposed between an inner ring member and an outer ring member, said bearing cage comprising:
base material;
reinforced fiber; and
solid lubricant;
wherein
said base material is thermoplastic resin;
said reinforced fiber and said solid lubricant are mixed with said base material;
said solid lubricant comprises polytetrafluoroethylene; molybdenum disulfide and graphite, wherein said polytetrafluoroethylene of 5 to 30 wt % said molybdenum disulfide of 3 to 15 wt % and said graphite of 3 to 15 wt % are mixed.

10. The bearing cage according to claim 9, wherein said thermoplastic resin is ethylene tetrafluoroethylene.

11. The bearing cage according to claim 9, wherein said thermoplastic resin is polyether ether ketone.

12. The bearing age according to claim 9, wherein said thermoplastic resin is polyamidimide alloy.

13. The bearing cage according to claim 9, wherein said thermoplastic resin is thermoplastic polyimide.

14. The bearing cage according to claim 9, wherein said reinforced fiber of 5 to 30 wt % is mixed with said base material.

15. The bearing cage according to claim 9, wherein said reinforced fiber is potassium titanate whisker.

16. The bearing cage according to claim 9, wherein said reinforced fiber is short fiber having a diameter of 2 μm or less.

17. The bearing cage according to claim 9, wherein said reinforced fiber is fiber having average fiber diameter of 0.3 to 0.6 μm.

18. The bearing cage according to claim 9, wherein said reinforced fiber is fiber having average fiber length of 10 to 20 μm.

19. A bearing cage interposed between an inner ring member and an outer ring member, said bearing cage comprising:
base material;
reinforced fiber; and
solid lubricant;
wherein
said base material is thermoplastic resin selected from either one of ethylene tetrafluoroethylene, polyether ether ketone, polyamidimide alloy and thermoplastic polyimide;
said reinforced fiber of 5 to 30 wt % is mixed with said base material;
said solid lubricant comprises polytetrafluoroethylene of 5 to 30 wt %, molybdenum disulfide of 3 to 15 wt % and graphite of 3 to 15 wt % and is mixed with said base material.

20. A bearing cage interposed between an inner ring member and an outer ring member bearing cage comprising:
base material;
reinforced fiber; and
solid lubricant;
wherein
said base material is thermoplastic resin selected from either one of ethylene tetrafluoroethylene, polyester ether ketone, polyamidimide alloy and thermoplastic polyimide;
said reinforced fiber is potassium titanate whisker, said reinforced fiber of 5 to 30 wt % being mixed with said base material;
said solid lubricant comprises polytetrafluoroethylene of 5 to 30 wt %, molybdenum disulfide of 30 to 15 wt % and graphite of 3 to 15 wt % and graphite of 3 to 15 wt % and is mixed with said base material.

* * * * *